United States Patent [19]

DeVet et al.

[11] Patent Number: 5,513,269
[45] Date of Patent: Apr. 30, 1996

[54] CONSUMER APPLIANCE HAVING BOTH EXPLANATORY COMMENT AND EXTRA-LINGUISTIC SIGNALIZATION UPON ACTUATION THEREOF AND REVERSIBLE STEPPING BETWEEN THOSE TWO

[75] Inventors: Johnannes H. M. DeVet; Johannes A. M. Kemp; Cornelis J. Van Deemter, all of Eindhoven, Netherlands

[73] Assignee: U.S. Philips Corporation, New York, N.Y.

[21] Appl. No.: 178,147

[22] Filed: Jan. 6, 1994

[30] Foreign Application Priority Data

Jan. 7, 1993 [EP] European Pat. Off. ............. 93200029

[51] Int. Cl.$^6$ .................................................. B60R 25/00
[52] U.S. Cl. ........................................................ 381/123
[58] Field of Search ............................ 381/123; 340/426, 340/528, 825.31; 434/321, 334

[56] References Cited

U.S. PATENT DOCUMENTS 4,464,124  8/1984  Romero et al. ................... 434/321
4,887,064  12/1989  Drori et al. ....................... 340/426
5,088,928  2/1992  Chan ................................. 434/334

FOREIGN PATENT DOCUMENTS 2248336  1/1992  United Kingdom ............ G11B 33/10

*Primary Examiner*—Stephen Brinich
*Attorney, Agent, or Firm*—David Schreiber

[57] ABSTRACT

A consumer appliance having both explanatory comment and extra-linguistic signalization upon actuation thereof and reversible stepping between those two.

An electronics-controlled consumer appliance has various hardwared actuator elements for through actuation thereof driving the appliance from a present state to an associated respective destination state. It also has audio output for under control of selected present state-actuation combinations outputting a specific audio specifier. By way of improvement the specifier comes in a two-tier organization: in an upper tier it outputs an explanatory audio comment and in a lower tier it outputs an extra-linguistic audio signalization. Furthermore, the device allows for selectively and reversibly stepping between said two tiers.

8 Claims, 4 Drawing Sheets

5,513,269

CONSUMER APPLIANCE HAVING BOTH EXPLANATORY COMMENT AND EXTRA-LINGUISTIC SIGNALIZATION UPON ACTUATION THEREOF AND REVERSIBLE STEPPING BETWEEN THOSE TWO

BACKGROUND OF THE INVENTION

The invention relates to an electronics-controlled consumer appliance device comprising a plurality of hardwared actuator elements for through respective actuation of such actuator element driving said appliance device from a present state to a destination state associated to a present state-actuation combination of said present state and said actuation, and also comprising audio output means for under control of each subset element of at least a subset of all possible present state-actuation combinations outputting an audio specifier with respect to such subset element combination. A consumer appliance device is a device for rendering certain services to a generally non-expert user and includes, but is not limited to a device for audio and/or video entertainment, a game computer, a device for cleaning dishes, laundry, cars, flooring and other property, an environmental control device for the home, a motor car, and various others. In a somewhat more limited sense it is an arrangement of one or more localized articles that alone or in combination provide some service to the general user. Present day devices incorporate an increasing amount of control features that come with a likewise increasing amount of control actuators that are actuated by hand, foot, voice, remote control and other mechanisms. In consequence, the number of present state-actuation combinations also has grown enormously. It has been found that as a consequence a user who is inexperienced with the device in question will make many actuation errors and often will not go into acquiring the knowledge of all relevant functionality features of the device. It has been proposed to supplement the actual actuation with particular explanation, in particular so, when the appliance device is intended for audio and/or video entertainment, because the associated audio and/or video output channels are inherent to the device. Now, if the explanation is on a video screen, it tends to be overlooked or unintelligible. If by speech, this tends to become in time an annoying disturbance. Nevertheless, it appears that some feedback to the user is advantageous, which would render inappropriate the terminating of the signalization for all future.

SUMMARY TO THE INVENTION

In consequence, amongst other things, it is an object of the present invention to provide the device according to the preamble with an appropriate amount of feedback that allows for in dependence of an actual situation choosing between an explanatory comment and a distinct, but not overly specific audio signalization. Thereto, according to one of its aspects, the invention is characterized in that said audio output means with respect to at least one such subset element combination have a two-tier operability, for in an upper tier outputting an explanatory audio comment and in a lower tier outputring an extra-linguistic audio signalization, said device furthermore having a changeover mechanism for selectively and reversibly stepping between said two tiers. Thus, the stepping is not definitive, but can be reversed. In particular, an inexperienced user could need explicit feedback, whereas an expert user would only need a rather unspecific signal, such as a "beep" or "bom" percussion sound. Various such sounds are discussed hereinafter.

Advantageously, said audio output means have said two-tier operability exclusively with respect to an inconsequential present state-actuation combination. Especially upon an erroneous actuation, the novice would need some guidance, for example while trying in a shop. During everyday usage, the long explanation could be felt as dreary. In that case, the device could be operated with the extra-linguistic audio signalization. Nevertheless, in such cases where uncertainty still exists, the user would experience the explanatory audio comment both as quite natural and as an explicit source of useful infomarion.

Advantageously, said changeover mechanism in at least one direction of said stepping is operative automatically. The device itself, according to some appropriate strategy, would 'know' when the explicit comment would no longer be useful, or, on the other hand should be reinstalled.

Alternatively, said changeover mechanism in at least one direction of said stepping is activated through an explicit user actuation. An example for reinstatement of the explicit comment would be by a 'help' button. The two ways of changeover can be combined in various ways. One direction could be automatic and the other manually, or one or both directions could have both the automatic and the manually activated changeover side-by-side.

Advantageously, an appliance device and having a standard audio output functionality mode, and furthermore having temporal windowing means for under control of said explanatory comment outputting temporally down-controlling an actual audio volume of said standard audio in favour of said explanatory comment. For example, during listening to a radio broadcast, this would render the explanatory audio comment better understandable. The profile of the windowing may be various, as explained hereinafter.

Various further advantageous aspects of the invention are recited in dependent Claims.

BRIEF DESCRIPTION OF THE DRAWINGS

Further aspects and advantages of the invention will become apparent through the preferred embodiments described hereinafter, and in particular through the appended figures that show.

DESCRIPTION OF THE PREFERRED EMBODIMENTS

Various aspects of a consumer appliance whereto the invention may be added, but not the present invention itself, have been described in previous Patent Application EP 92202150.6 corresponding U.S. Ser. No. 08/089,959, (PHN 14.124=Speacop I), now abandoned, herein incorporated by reference. The earlier work related to the mapping of certain keys of any subaltern module to the principal module of a multi-module device. This allowed to diminish the overall number of actuator elements in that the subaltern modules now had very few of those, sometimes only a single one. In that case, the explanation of the key functionality was visual, which had its weaknesses as explained supra. Hereinafter, the more general term "actuator" is used, which would encompass push-buttons and other keys such as toggles, but also rotary buttons, sliders, soft keys on a touch screen and likewise, such actuators when located on a remote control device. Now, the present invention, although useful with such mapped-multimodule device, can likewise be applied with a multimodule device without the above mapping, or even with a one-module device: even in such environment that from an ergonomical point of view is less sophisticated, the present invention eases the burden of a user. For improved assessment, first a part of the earlier disclosure is imported herein.

Figure 1:
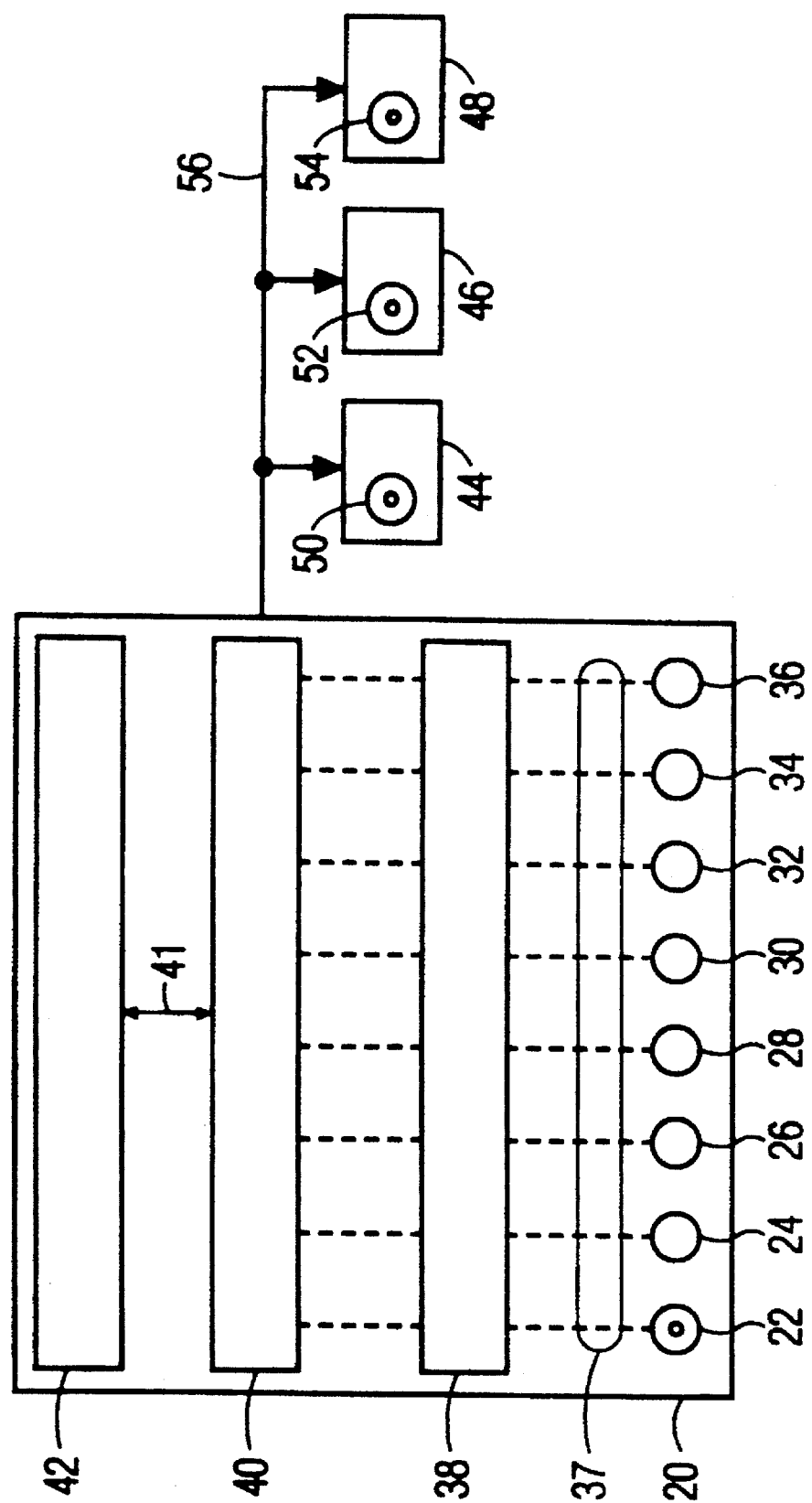
FIG. 1 a block diagram of a device wherein the invention may be embodied.
Figure 2:
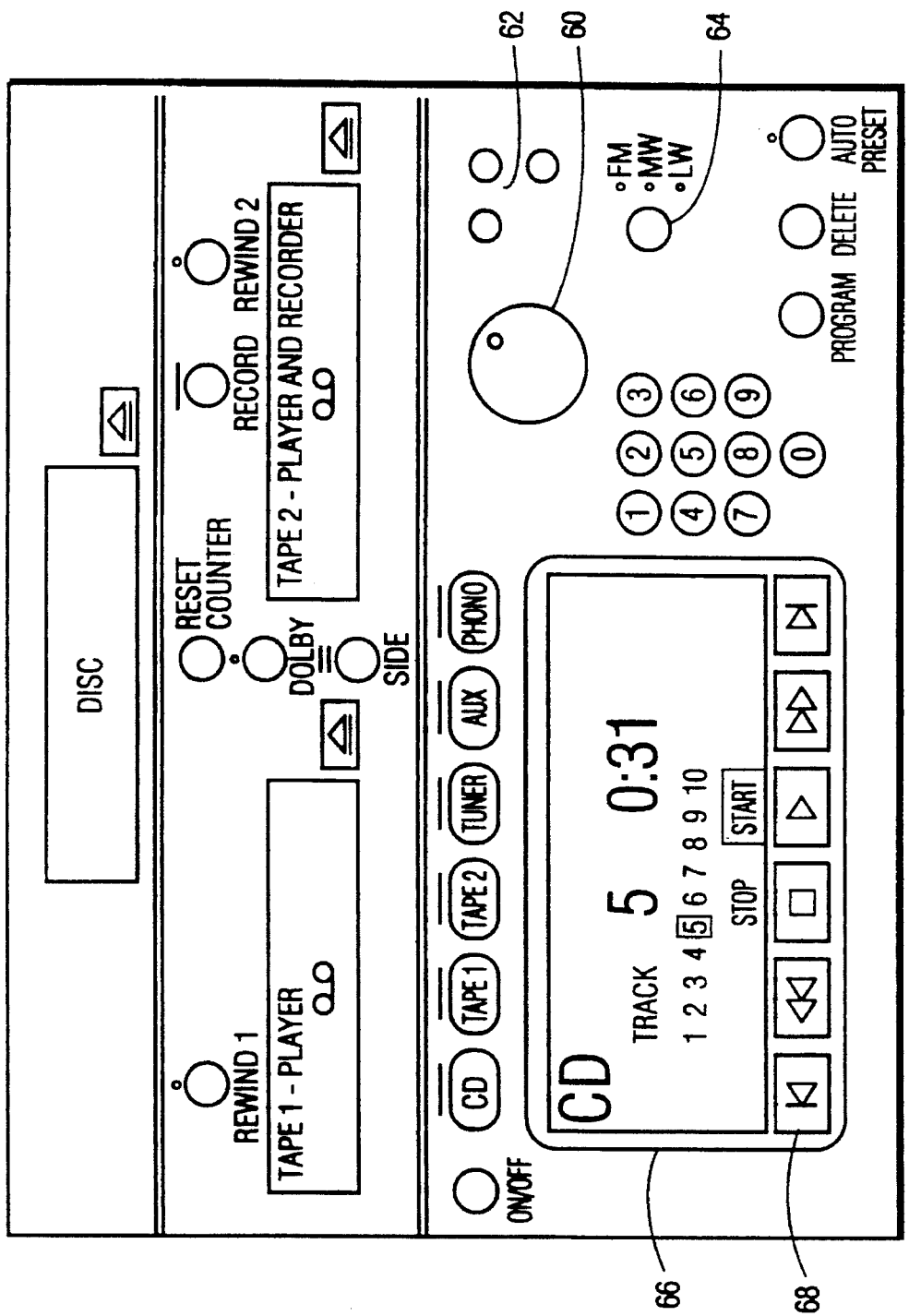
FIG. 2 a front view of a consumer audio apparatus.

FIG. 1 shows a block diagram of a device wherein the invention may be embodied, and FIG. 2 a front view of a consumer audio apparatus, both taken from the referenced disclosure. The arrangement of FIG. 1 in particular comprising superior module 20, and further modules 44, 46, 48. The modules are interconnected by a control network 56, that may be a serial single channel bus which supports a multi-master organization. However, the invention does not particularly relate to the functionality of the interconnection network. The superior module has been provided with various control actuators or buttons 22 through 36, inclusive of activating button 22, a display field 38, a central control unit 40, and a user functionality unit 42. The other modules each have a single activating button 50, 52, 54. Their control units nor their user functionality units have been shown. Actuation of the respective activating buttons 22, 50–54 is detected by the local control module, and an activation message is subsequently sent over network 56: this terminates the active state of any other module. If the superior module 20 is activated, buttons 24 through 36 are assigned particular functions. The function may be accessed by pressing the button in question. Each button has its functionality shown by a display indication. This may be a lighted icon on the button in question, or just a sign, pictogram or letter, printed on the button or near it. Accessing may change the nature of the display, such by increase of the light strength, changing the display colour, by blinking, or otherwise. A different way of display is by means of a software controlled display element on display 38. The accessed functionality is signalled to control unit 40, which thereupon drives the user functionality unit 42 to the appropriate operation. If now a different module such as 44 is activated by pressing button 50, module 20 is rendered inactive. This does not apply to the actual user functionality that may be maintained or not, as the case may be. For example, adjustment of a preferred broadcast frequency may be maintained. However, if the superior module is the amplifier, the sound may be made less loud if subsequently a recorder is activated. Now, however, various notional actuator functionalities of module 44 are mapped on respective ones of the buttons or actuators 24 through 36, and even, if required, on button 22. The mapping pattern is predetermined with respect to module 44, and fixed. Each of the buttons that now has a function with respect to module 44, which need not necessarily pertain to all buttons 24 through 36, may now have an indication of the latter functionality. This may take various forms. A very simple one is that the original icon is maintained. For example, if the superior module is a tape deck module, the mapping thereon of the control buttons for a CD-player would mean that various actuators, although the destination of a mapping operation, would now have actuation functions that would closely correspond to their original ones. However, various ones of the buttons may have such different functionality that also the name of the function is changed. In particular, this is realized in that a new or modified explicator indication occurs on display element 38 as a display item. This may again be an icon, or one or more words explaining or symbolizing the function to be activated by the button in question. If the display is verbal, the content thereof may be controlled by origin module 44. This means that the superior module may, but need not, know expressly the function to be effected by the actuation of a particular button. It is just required that the origin module of the mapping gets back a message over the network 56 as to what it should do according to the effected actuation of one of the buttons on the superior module. Again the indication the display may have an accessory element or property, such as colour, shape, blinking, for drawing attention. Upon the effected actuation, both the explicatory indication itself and also any accessory element or property may be amended. For brevity, the exact user functionality, the distribution thereof over the various modules, and the cooperation of the modules on a user functionality level have not been described. For simplicity, all buttons have been shown identical, but this is not a restriction. There may be toggle buttons, toggle switches, rotary buttons, sliders and various others. Also, they may have different sizes, shapes, colours, textures and such features that would make them more or less prominent in accordance with the intended use. Their actuatability functionality may be unchanged through the cross-module mapping, or be modified. For example, buttons may change from a toggling on-off control to an one-out-of-n activation, wherein n may have higher values, such that actuating a particular button would render inactive the other n−1, in the same way that only one of the modules is active at any one time. As shown, all modules can be mapped on the single superior module, but various other configurations are feasible. Certain modules may not be mappable, and there may be two or even more superior modules, wherein any non-superior module is mappable on a particular one of the superior modules.

Now, the description of the overall functionality of FIG. 1 is not particular to the present invention. The user functionality unit 42 and the central control unit communicate via line 41. The buttons 22–26 communicate with control unit 40, and with display field 38 and associated control along dotted lines collectively indicated by 37. The various functionalities in the respective modules communicate along interconnections not shown, inasfar as necessary for the overall functioning of the device. In particular cases control and function may both be communicated over network 56.

FIG. 2 is a front view of a device according to the invention; the functionality is that of a stereo tower. By itself, the functionality of the modules is conventional. The top module is a Compact Disc player that as indicated features has only a tray "disc" and a control button for loading and unloading. The next lower module is a double tape deck with a left tape and a right tape. Each tape has a rewind control button and a load/unload button. Furthermore there is a central reset counter button, a "dolby" selection button, a "side" selection button that allows to select between "forward" and "backward" side in an auto-reverse organization, and a "record" button for the right hand tape. Various buttons have a companion light indicator (dot or stroke) to indicate an active or inactive state. The "side" button has two strokes that indicate "forward" or "reverse" respectively.

The superior module has a row of buttons that activate one of the modules: from left to right, the CD player, the tape deck left tape, the tape deck right tape, the tuner itself, an auxiliary signal source that can be connected to a rear plug not shown, and an additional phono input. All of these have an indicator light showing which of the modules had been selected. Furthermore, there is an ON/OFF button to control the overall activity of the device. At right there is a large rotary button 60, for example to control tuner frequency, three small rotary buttons 62, to control balance, treble, and loudness, respectively, and a single button 64 that controls cycling through three broadcast band regions that are indicated through three small LEDs respectively, a ten digit numerical pad, and three selective buttons that in particular relate to the tuner function proper: program, delete, and auto preset. These buttons select the associated respective functions of the tuner. Selection thereof may influence the display on display element 66 in that appropriate parameters of these three functionalities are displayed, but here, the mapping is inside a single functionality module. Finally, there is a set 68 of six buttons that are the destinations of the cross-module mapping. In the present situation, the CD player is the active module and is actually playing: CD SPEELT. The actually active actuatability pattern is displayed by big display field 66. As shown, this first signals actual operational state: the CD is playing. Next to this signalization, the display signals which track is playing and the time duration since the start of the track. The same is shown once more by a graphical quasi representation in the shape of a small square that steps along the digits that indicate tracks 1 to 10. Furthermore, each of the buttons that is presently activatable has a one or two-word indication as shown, in addition to a standard functionality icon that has been shown on the hardware button. In sequence, the six functionalities are from left to right: previous tune, fast backward, stop, play, fast forward, and next tune. In the situation shown, only one of the six mappable buttons is active, as shown by a square around the associated DISPLAY indication of the button in question. This is no limitation inasmuch as two or more of functionalities could be active coexistently.

Now, the present invention provides audio specifiers realized as either explanatory comments or extra-linguistic signalization as a help for the user, in particular the inexperienced user. In consequence, the visual signalization described to some extent can be omitted or be made more compact. This, of course, could allow for a smaller and/or quieter front of the device, which could render controlling easier and/or make the device's visual features more agreeable.

Figure 3:
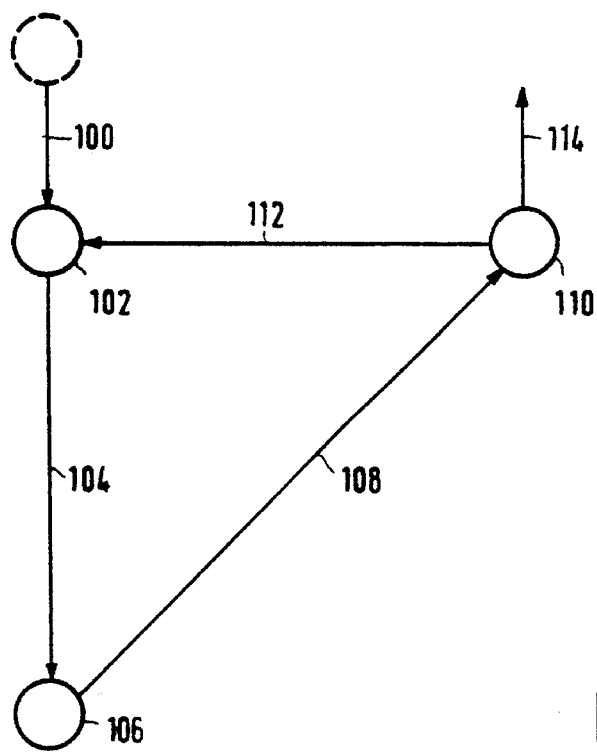
FIG. 3 an elementary diagram of a three-state device.

FIG. 3 is an elementary diagram of a three-state device. All states and controls have been shown as circles and arrows, respectively. For brevity, no attention is paid to actual functionality. The actuation may be a set of push buttons. Now, the control is as follows. Upon actuation 100 the device goes "on" in state 102. Actuation 104 drives it from present state 102 to destination state 106. Actuation 108 drives it from present state 106 to destination state 110. Actuation 112 drives it from present state 110 to destination state 102. Actuation 114 drives it from present state 110 to "off". All other combinations of present state and actuation have no effect whatsoever.

Figure 4:
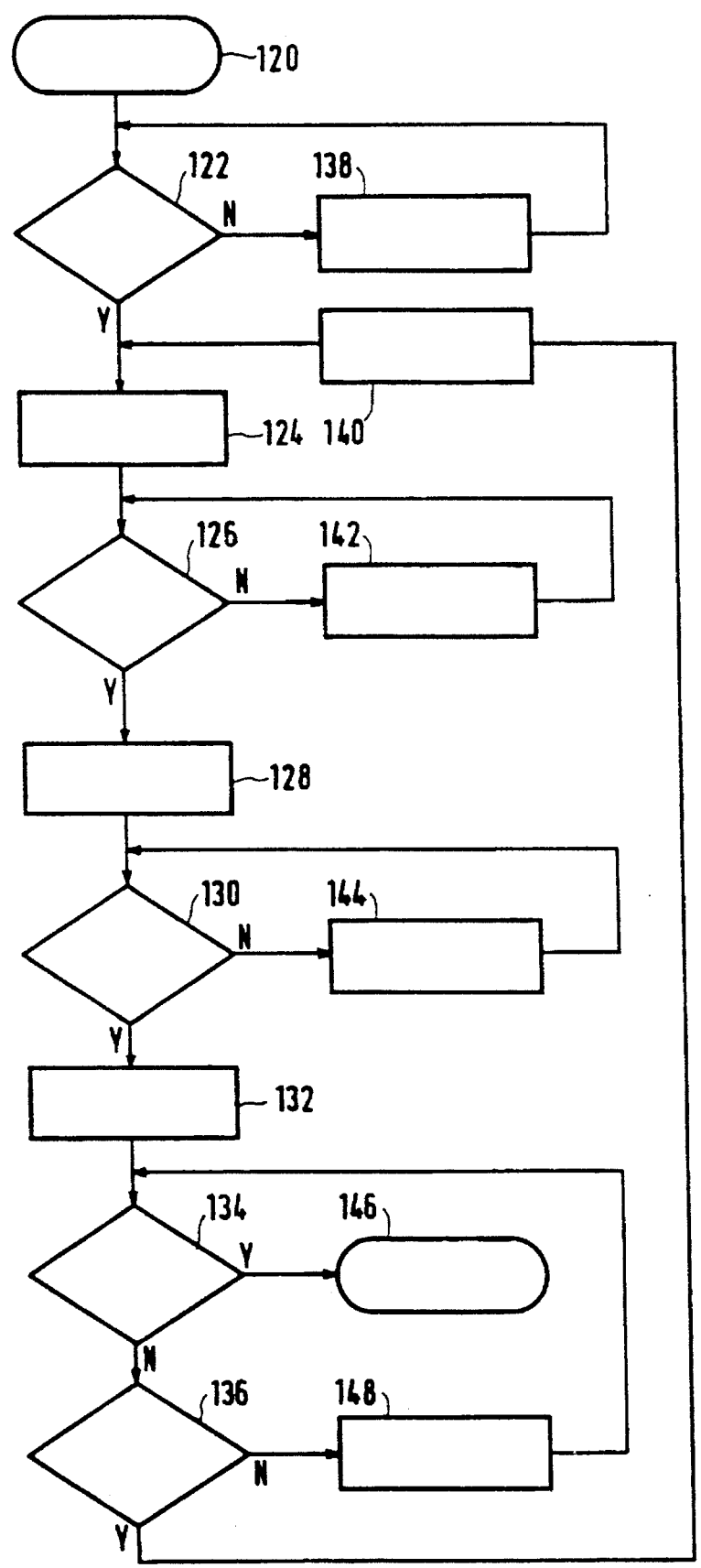
FIG. 4 a control flow chart highlighting the invention.

For example, if the device is in state 106, actuations 104, 112, 114 do not change present state. This simple state diagram has three categories of state. First, there is a state or pseudo-state with no exit directions: the rest state, wherein no audio specifier is given, or even can be given. Second, there are states wherein only a single actuation is useful: in these, the explanation can give a complete directive. Third, there is one state (110) wherein two or more actuations would have a useful result. In those states, the explanation may be of various types: it may signal an error, it may give a complete directive, it may point to a location in the manual, it may only specify the most probable way to proceed, or it may give any combination of the above. In FIG. 4, a simple solution is given.

FIG. 4 shows a control flow chart highlighting the invention. The situation is the same as in FIG. 3. First, in block 120, the system is initialized, such as by closing the mains switch, which may cause the loading of a program, parameters, etcetera. Next, in each respective state, the system enters a waiting loop to detect any subsequently occurring actuation. For clarity, the waiting loops have not been shown explicitly. Upon such detection, in block 122 the nature of the actuation is detected: if 100, the system goes to state 102 (and in block 124 the necessary actions for this state are executed). If any other actuation, the system goes to block 138 for generating an audio specifier, which at first is an explanatory comment that the user should effect actuation 100 instead. Subsequently, the waiting loop is entered again. The combination of blocks 122, 124, and 138, is repeated for states 102 (blocks 126, 128, 142) and 106 (blocks 130, 132, 144). In block 132, state 110 is reached. In block 134 actuation 114 is detected. If yes, the system exits to block 146 and terminates its activity. Resumption thereof needs a new initialization as in block 120. If no, in block 136 actuation 112 is detected. If yes, the system goes to block 140. If no, the audio specifier of block 148 indicates that actuation 112 should be given. Block 140 controls the representation of the audio specifier. As explained earlier, especially with respect to state 110 various types of audio specification could be given.

As regards the changeover between the explanatory comment and the extra-linguistic signalization, various policies can be useful. A simple solution is that passage of block 140 always changes all specifiers to the extra-linguistic signalization, such as a beep. At initialization, the full explanatory comment is reinstated. A second solution is that block 140 measures a particular time, and the transition to the extra-linguistic signalization is effected only after that time. A third solution is by logging: correct execution of any actuation is counted, and any actuation that reaches its associated count is thereafter only specified by beep upon activation of an erroneous actuation. A fourth solution is that the user may set to or reset from beep only, either for all actuations collectively, or for respective subsets of present state-actuation combinations, or even selectively for each present state-actuation separately. This control could, for example, be by a toggle, such as at the rear side of the device. Various other solutions and combinations of the above are feasible.

Hereinafter, an exemplary realization of the various explanatory comments and extra-linguistic signalizations is given as follows. For the apparatus according to FIGS. 1 and 2, a set of seventeen messages listed. For the development of the embodiment of the present invention, each actuation could cause any of three signalizations, and in particular a relatively long visual message (v), a speech message (s), and a non-speech message (n) in combination with a relatively short visual message. This relatively short visual message has also been shown during the speech message, but has not bene shown in the table as such. All visual messages have been listed in capital letters. In general, message 1 is a feed-forward message during Power-on, messages 2–5 are source selection messages, messages 6–10 are tuner messages, messages 11, 12 are recording messages, messages 13–16 are 'mode error' messages and 17 is the general error message.

| 1 | (during power on, for a period of four seconds) v: "THE SAME CONTROLS FOR CD, TAPE AND TURNER" s/n: — |
|---|---|

Here, the audio specifier is omitted, the visual display signalling the above-discussed mapping feature of almost all actuators on the principal module. Furthermore, the configuration is limited to tuner-double tape deck-CD-player. Other possible inputs to the device are unconnected, such as a mechanical record player.

| 2 | (tape 1 pressed) s: "for playing, press on start" |
|---|---|

|   |   |
|---|---|
|   | v: "TAPE 1 PLAYING, SELECT START"<br>n: "TAPE 1 STOPPED" ('tom' sound) |

Here the device signals that tape 1 has only play functionality, whereas recording is automatically steered to tape 2 after selection of an applicable source.

| 3 | (tape 2 pressed) |
|---|---|
|   | s: "for recording, select source and press record"<br>v: "TAPE 2 RECORDING, SELECT CD/TUNER AND RECORD"<br>n: "TAPE 2 STOPPED" ('tom' sound) |

Here, the above automatic function is explained, and the user is suggested to go on.

| 4 | (phono pressed) |
|---|---|
|   | s: "this source is not connected"<br>v: "PICK-UP, IS NOT CONNECTED"<br>n: "PICK-UP" ('tom' sound) |
| 5 | (aux pressed) |
|   | s: "this source is not connected"<br>v: "AUX, IS NOT CONNECTED"<br>n: "AUX" ('tom' sound) |

As stated before, these two sources have not been provided in the arrangement according to FIG. 2. If applicable, the device could be self-detecting as to the presence or absence of these respective sources. Note that the -tom- sound has been chosen for the category of present state-actuation combinations that relate to selection of a source for playing and/or recording. All extra-linguistic signaiizations have been chosen from a broad category that resembles various percussion elements.

| 6 | (invalid number key pressed, and source is tuner and not in program mode) |
|---|---|
|   | s: "for programming a tuner preset, first press program"<br>v: "TO PROGRAM TUNER PRESET, PRESS PROGRAM"<br>n: — ('marimba' sound) |
| 7 | (program is pressed, and source is tuner) |
|   | s: "give a preset number and frequency"<br>v: "TO PROGRAM TUNER PRESET GIVE NUMBER AND FREQ"<br>n: — ('marimba' sound) |

Generally, the -marimba- sound applies to situations wherein the ten-key-digit pad has been actuated or must be actuated for correctly proceeding.

| 8 | (button, other than key number or Forward or Backward, is pressed in tuner program mode) |
|---|---|
|   | s: "give preference number and frequency"<br>v: "GIVE NUMBER AND FREQUENCY"<br>n: — (corresponding to situation) |

Here, the extra-linguistic signalization is either a -tom- (if the source must be chosen) or a -marimba- (if a numerical entry must be made).

| 9 | (Auto preset pressed, and source is not tuner) |
|---|---|
|   | s: "with this button you may program automatically presets in the tuner"<br>v: "THIS BUTTON FOR AUTOM TUNER PRESET PROG"<br>n: — ('cymbal' sound) |

Generally, the-cymbal- sound is used to signal an error by the user.

| 10 | (Auto Preset briefly pressed, and source is tuner) |
|---|---|
|   | s: "if you want to automatically program transmitters, press this button longer"<br>v: "HOLD BUTTON TO INSTALL TUNER PRESET"<br>n: "HOLD" ('marimba' sound) |
| 11 | (Record pressed, and source is tape 2) |
|   | s: "to allow recording, first choose a source"<br>v: "RECORD, FIRST SELECT SOURCE"<br>n: — ('cymbal' sound) |

As explained earlier, the apparatus first needs a source specified and then always records on tape 2.

| 12 | (Record briefly pressed, and source is not tape 2) |
|---|---|
|   | s: "if you want to record, hold this button pressed longer"<br>v: "HOLD BUTTON TO RECORD"<br>n: "HOLD" ('marimba' sound) |
| 13 | (Waveband pressed, and source is not tuner) |
|   | s: "this button applies to the tuner"<br>v: "THIS BUTTON RELATES TO THE TUNER"<br>n: — ('cymbal' sound) |
| 14 | (Delete, Program, or number key is pressed, and source is not CD or tuner) |
|   | s: "this button is not for the tapedeck"<br>v: :THIS BUTTON DOES NOT RELATE TO TAPEDECK"<br>n: — ('cymbal' sound) |
| 15 | (Side pressed, and source is not tape 1 nor tape 2) |
|   | s: "with this button you select the other tape side"<br>v: "THIS BUTTON SELECTS OTHER TAPE SIDE"<br>n: — ('cymbal' sound) |
| 16 | (Dolby or reset counter is pressed, and source is not tape 1 or tape 2) |
|   | s: "this button relates to the tapedeck'<br>v: "THIS BUTTON RELATES TO THE TAPEDECK"<br>n: — ('cymbal' sound) |

The well-known Dolby-feature reduces noise during tape playback. The button is a set-reset toggle.

The -reset- button resets the tape length counter for accurate measurement of actual tape positions.

| 17 | (general 'button is disabled' condition) |
|---|---|
|   | s: "this button cannot be used now"<br>v: (display unchanged)<br>n: — ('cymbal' sound) |

In a first embodiment of the invention, the above user interface has been simulated on a large television screen, wherein the face generally corresponded to that of FIG. 2. Furthermore, actual user functionality, such as tuning, recording, playing, etcetera also was simulated. The users generally reacted very positive to the provisions according to the present invention.

Figure 5A:
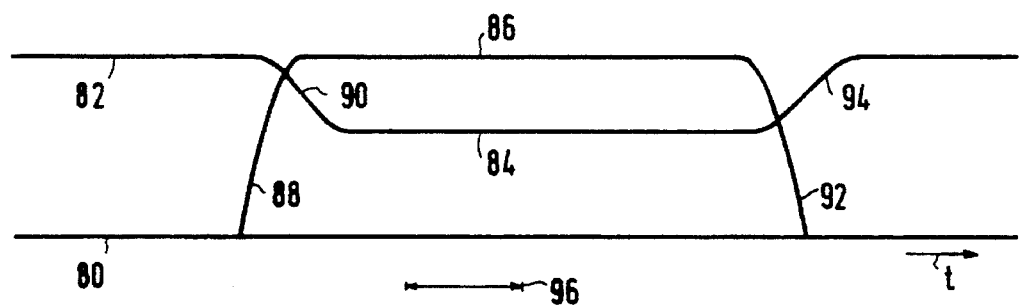
FIG. 5A–5B explain various aspects of the temporal windowing.

FIG. 5 explains various aspects of the temporal windowing. In FIG. 5A the axis 80 indicates the time, wherein arrow 96 shows the approximate duration of one second. Trace 82 shows diagrammatically the output volume of an audio user signal. This may relate to the play volume of a CD record, a broadcast radio program, synthetic speech in a CD interactive or other. For simplicity, the volume is presumed to be uniform. Trace 88-86-92 likewise indicates the audio volume of the explanatory comment that is output upon a particular actuation by a user. Also here, the volume is supposed to be uniform which is only a very rough approximation. Speech loudness may vary by several dB during a sentence, even if the pauses are ignored. Music loudness (of the standard audio output) may have still greater volume variation. Now, during the explanation, the user output signal is attenuated as shown by dip 90-84-94. Various parameters may be optimized, such as:

the onset of the comment versus the lowering of the user output volume (the latter may be later by a fraction of a second), the steepness of edges 88–92 and the corresponding steepness of the edges 90–94 (they need not be equal), the audio volume of the comment (it may have a standard volume or the volume may be related to actual user output volume, the latter generally being preferred: it is assumed that the user output volume were already adapted to the user's preference, such as dictated by background noise, or distance between speakers and audience), the amount of lowering the user output volume (it may be a uniform dB value or it may have a more complicated relation), the amount may depend on the character of the actual user output (speech versus nonspeech, wherein non-speech could give smaller attenuation), the amount may depend on the character of the explanation, such as depending on its length, on the critical or noncritical character of the right actuation to be made, or a possible critical character of the actual situation of the device). Various other factors may come into play.

Figure 5B:
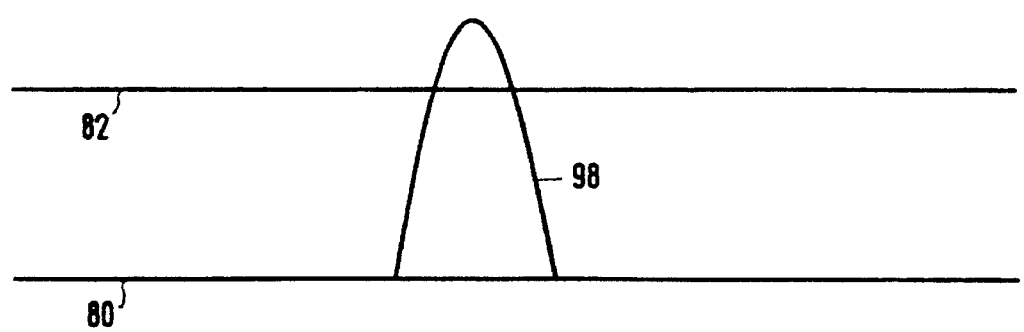

Likewise, in FIG. 5B the axis 80 indicates the time. Trace 82 has the same significance as in FIG. 5B. Trace 98 shows diagrammatically the output volume of the extra-linguistic signalization that is output upon a particular actuation by a user. The volume is supposed to have rather sharp peak, but other shapes could apply, especially in such cases where the signalization mimics some kind of musical instrument, such as a marimba. In the example, the normal user audio output continues independently of signalization 98, the latter temporarily having a higher output volume. In other cases this would not even be necessary; if required, the standard audio 82, just as in FIG. 5A, could have a dip as well. Various ones of the factors discussed with respect to the earlier Figure could apply here as well.

FIGURE LABELS

FIG. 1

20: superior module; 44, 46, 48: other modules; 22–36: control actuators; 38: display field; 40: central control unit; 42: functionality unit; 50, 52, 54: activating buttons.

FIG. 2

60: frequency button; 62: balance, treble & loudness buttons; 64: waveband selector.

FIG. 3

102, 106, 110: states; 100, 104, 108, 112, 114: actuations.

FIG. 4

120: initialize; 122: actuation 1007; 124: execute actions of state 102; 138: give audio specifier; 126: actuation 104? 128: execute actions of state 106; 142: give audio specifier; 130: actuation 108? 132: execute actions of state 110; 144: give audio specifier; 134: actuation 114? 146: terminate activity; 136: actuation 112? 148: give audio specifier; 140: control representation of audio specifier(s).

What is claimed is:

1. A device having a finite set of states, comprising:

an actuator element for changing a state of said device from a present state to a destination state upon actuation of said actuator element by a user;

a memory including audio information corresponding to a plurality of combinations of states and actuator elements;

a generator for generating a plurality of non-speech audio information corresponding to a plurality of combinations of states and actuator elements;

a detection circuit for detecting said present state and said activated actuator element;

a selection circuit, responsive to said present state and said activated actuator element, for selecting, in a first mode, audio information corresponding to at least one of said activated actuator element and said present state and, in a second mode, non-speech audio information corresponding to at least one of said activated actuator element and said present state; and an output circuit responsive to said selection circuit for outputting one of said audio information and said non-speech audio information to said user.

2. The device as claimed in claim 1, wherein one of said first mode and said second mode is selected by the user.

3. The device as claimed in claim 2, wherein one of said first mode and said second mode is selected by said selection circuit.

4. The device as claimed in claim 1, wherein one of said first mode and said second mode is selected by said selection circuit.

5. The device as claimed in claim 1, wherein said generator generates non-speech audio information for a predetermined number of groups of combinations of states and actuator elements.

6. An appliance device as claimed in claim 1 and being arranged for audio and/or video representation for consumer entertainment.

7. An appliance device as claimed in claim 1, and having a standard audio output functionality mode, and furthermore having temporal windowing means for under control of said explanatory comment outputting temporally down-controlling an actual audio volume of said standard audio in favour of said explanatory comment.

8. An appliance device as claimed in claim 7, said temporal windowing means having foregoing means for under control of said extra-linguistic signalization foregoing said down-controlling.

* * * * *